United States Patent
Sejnoha

(10) Patent No.: US 6,260,013 B1
(45) Date of Patent: *Jul. 10, 2001

(54) SPEECH RECOGNITION SYSTEM EMPLOYING DISCRIMINATIVELY TRAINED MODELS

(75) Inventor: Vladimir Sejnoha, Cambridge, MA (US)

(73) Assignee: Lernout & Hauspie Speech Products N.V., Ieper (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/818,072

(22) Filed: Mar. 14, 1997

(51) Int. Cl.[7] .................................................. G10L 15/08

(52) U.S. Cl. ........................................... 704/240; 704/241

(58) Field of Search ................................... 704/240, 241, 704/222, 251, 255, 244, 243

(56) References Cited

U.S. PATENT DOCUMENTS

| | | | |
|---|---|---|---|
| 5,027,406 | * 6/1991 | Robarts et al. | 704/240 |
| 5,233,681 | * 8/1993 | Bahl et al. | 704/240 |
| 5,280,563 | 1/1994 | Ganong . | |

(List continued on next page.)

FOREIGN PATENT DOCUMENTS

| | | |
|---|---|---|
| 0376 501 | 11/1989 | (EP) . |
| 0 559 349 A1 | 2/1993 | (EP) . |
| WO 95/09146 | 4/1995 | (WO) . |

OTHER PUBLICATIONS

Tadj, C. Keyword Spotting Using Supervised/Unsupervised Competite Learning. 1995 Internation Conference on Acoustics, Speech and Signal Processing. vol. 1 pp. 301–304, May 1995.*

Lee et al. A study on Speak Adaptation of the Parameters of Continuous Density HMMs. IEEE Transactions on Signal Processing, Apr. 1991.*

Huange et al. On Speaker–Independent, Speaker–Dependent, and Spekaer–Adaptive Speech Recognition. IEEE Transactions on Speech and Audio Processing, Apr. 1993.*

(List continued on next page.)

Primary Examiner—Fan Tsang
Assistant Examiner—Michael N. Opsasnick
(74) Attorney, Agent, or Firm—Bromberg & Sunstein LLP

(57) ABSTRACT

A speech recognition system has vocabulary word models having for each word model state both a discrete probability distribution function and a continuous probability distribution function. Word models are initially aligned with an input utterance using the discrete probability distribution functions, and an initial matching performed. From well scoring word models, a ranked scoring of those models is generated using the respective continuous probability distribution functions. After each utterance, preselected continuous probability distribution function parameters are discriminatively adjusted to increase the difference in scoring between the best scoring and the next ranking models.

In the event a user subsequently corrects a prior recognition event by selecting a different word model from that generated by the recognition system, a re-adjustment of the continuous probability distribution function parameters is performed by adjusting the current state of the parameters opposite to the adjustment performed with the original recognition event, and adjusting the current parameters to that which would have been performed if the user correction associated word had been the best scoring model.

9 Claims, 5 Drawing Sheets

U.S. PATENT DOCUMENTS

| | | | | |
|---|---|---|---|---|
| 5,289,562 | * | 2/1994 | Mizuta et al. | 395/2 |
| 5,428,707 | * | 6/1995 | Gould et al. | 704/270 |
| 5,506,933 | * | 4/1996 | Nitta | 395/2.65 |
| 5,546,499 | * | 8/1996 | Lynch et al. | 395/2.49 |
| 5,572,624 | * | 11/1996 | Sejnoha | 395/2.65 |
| 5,617,486 | * | 4/1997 | Chow et al. | 395/2.65 |
| 5,710,864 | * | 1/1998 | Juang et al. | 704/241 |
| 5,710,866 | * | 1/1998 | Alleva et al. | 395/2.65 |
| 5,781,887 | * | 7/1998 | Juang | 704/275 |
| 5,822,730 | * | 10/1998 | Roth et al. | 704/255 |
| 5,852,801 | * | 12/1998 | Hon et al. | 704/270 |
| 5,857,169 | * | 1/1999 | Seide | 704/256 |
| 5,864,805 | * | 1/1999 | Chen et al. | 704/270 |
| 5,899,976 | * | 5/1999 | Rozak | 704/275 |
| 5,970,448 | * | 10/1999 | Goldhor et al. | 704/255 |

OTHER PUBLICATIONS

Y. Zhao, "A Speaker–Independent Continuous Speech Recognition System Using Continuous Mixture Gaussian Density HMM Of Phoneme–Sized Units"—IEEE Transactions On Speech And Audio Processing, vol. 1, No. 3, Jul. 1993, pp. 345–361.

P. Beyerlein & M. Ullrich "Hamming Distance Approximation For A Fast Log–Likelihood Computation For Mixture Densities" ESCA, Eurospeech '95, 4th European Conference on Speech Communication and Technology, Madrid, Sep. 1995. ISSN 1018–4074, pp. 1083–1086.

Y. Komori et al., "An Efficient Output Probability Computation For Continuous HMM Using Rough And Detail Models"—ESCA. Eurospeech '95. 4th European Conference on Speech Communication and Technology, Madrid, Sep. 1995, ISSN 1018–4074, pp. 1087–1090.

M. Bates et al., "The BBN/HARC Spoken Language Understanding System"—1993 IEEE, pp. II–111—II–114.

E. Bocchieri, "Vector Quantization For The Efficient Computation Of Continuous Density Likelihoods"—1993 IEEE, pp. II–692—II–695.

* cited by examiner

Structure of DMTR models.

SPEECH RECOGNITION SYSTEM EMPLOYING DISCRIMINATIVELY TRAINED MODELS

BACKGROUND OF THE INVENTION

The function of automatic speech recognition (ASR) systems is to determine the lexical identity of spoken utterances. The recognition process, also referred to as classification, typically begins with the conversion of an analog acoustical signal into a stream of digitally represented spectral vectors or frames which describe important characteristics of the signal at successive time intervals. The classification or recognition process is based upon the availability of reference models which describe aspects of the behavior of spectral frames corresponding to different words. A wide variety of models have been developed but they all share the property that they describe the temporal characteristics of spectra typical to particular words or sub-word segments. The sequence of spectral vectors arising from an input utterance is compared with the models and the success with which models of different words predict the behavior of the input frames, determines the putative identity of the utterance.

Currently most systems utilize some variant of a statistical model called the Hidden Markov Model (HMM). Such models consist of sequences of states connected by arcs, and a probability density function (pdf) associated with each state describes the likelihood of observing any given spectral vector at that state. A separate set of probabilities may be provided which determine transitions between states.

The process of computing the probability that an unknown input utterance corresponds to a given model, also known as decoding, is usually done in one of two standard ways. The first approach is known as the Forward-Backward algorithm, and uses an efficient recursion to compute the match probability as the sum of the probabilities of all possible alignments of the input sequence and the model states permitted by the model topology. An alternative, called the Viterbi algorithm, approximates the summed match probability by finding the single sequence of model states with the maximum probability. The Viterbi algorithm can be viewed as simultaneously performing an alignment of the input utterance and the model and computing the probability of that alignment.

HMMs can be created to model entire words, or alternatively, a variety of sub-word linguistic units, such as phonemes or syllables. Phone-level HMMs have the advantage that a relatively compact set of models can be used to build arbitrary new words, given that their phonetic transcription is known. More sophisticated versions reflect the fact that contextual effects can cause large variations in the way different phones are realized. Such models are known as allophonic or context-dependent. A common approach is to initiate the search with relatively inexpensive context-independent models and re-evaluate a small number of promising candidates with context-dependent phonetic models.

As in the case of the phonetic models, various levels of modeling power are available in the case of the probability densities describing the observed spectra associated with the states of the HMM. There are two major approaches: the discrete pdf and the continuous pdf. In the former, the spectral vectors corresponding to the input speech are first quantized with a vector quantizer which assigns each input frame an index corresponding to the closest vector from a codebook of prototypes. Given this encoding of the input, the pdfs take on the form of vectors of probabilities, where each component represents the probability of observing a particular prototype vector given a particular HMM state. One of the advantages of this approach is that it makes no assumptions about the nature of such pdfs, but this is offset by the information loss incurred in the quantization stage.

The use of continuous pdfs eliminates the quantization step, and the probability vectors are replaced by parametric functions which specify the probability of any arbitrary input spectral vector given a state. The most common class of functions used for this purpose is the mixture of Gaussians, where arbitrary pdfs are modeled by a weighted sum of Normal distributions. One drawback of using continuous pdfs is that, unlike in the case of the discrete pdf, the designer must make explicit assumptions about the nature of the pdf being modeled—something which can be quite difficult since the true distribution form for the speech signal is not known. In addition, continuous pdf models are computationally far more expensive than discrete pdf models, since following vector quantization the computation of a discrete probability involves no more than a single table lookup.

The probability values in the discrete pdf case and the parameter values of the continuous pdf are most commonly trained using the Maximum Likelihood method. In this manner, the model parameters are adjusted so that the likelihood of observing the training data given the model is maximized. However, it is known that this approach does not necessarily lead to the best recognition performance and this realization has led to the development of new training criteria, known as discriminative, the objective of which is to adjust model parameters so as to minimize the number of recognition errors rather than fit the distributions to the data.

As used heretofore, discriminative training has been applied most successfully to small-vocabulary tasks. In addition, it presents a number of new problems, such as how to appropriately smooth the discriminatively-trained pdfs and how to adapt these systems to a new user with a relatively small amount of training data.

To achieve high recognition accuracies, a recognition system should use high-resolution models which are computationally expensive (e.g., context-dependent, discriminatively-trained continuous density models). In order to achieve real-time recognition, a variety of speedup techniques are usually used.

In one typical approach, the vocabulary search is performed in multiple stages or passes, where each successive pass makes use of increasingly detailed and expensive models, applied to increasingly small lists of candidate models. For example, context independent, discrete models can be used first, followed by context-dependent continuous density models. When multiple sets of models are used sequentially during the search, a separate simultaneous alignment and pdf evaluation is essentially carried out for each set.

In other prior art approaches, computational speedups are applied to the evaluation of the high-resolution pdfs. For example, Gaussian-mixture models are evaluated by a fast but approximate identification of those mixture components which are most likely to make a significant contribution to the probability and a subsequent evaluation of those components in full. Another approach speeds up the evaluation of Gaussian-mixture models by exploiting a geometric approximation of the computation. However, even with speedups the evaluation can be slow enough that only a small number can be carried out.

In another scheme, approximate models are first used to compute the state probabilities given the input speech. All state probabilities which exceed some threshold are then recomputed using the detailed model, the rest are retained as they are. Given the new, composite set of probabilities a new Viterbi search is performed to determine the optimal alignment and overall probability. In this method, the alignment has to be repeated, and in addition, the approximate and detailed probabilities must be similar, compatible quantities. If the detailed model generates probabilities which are significantly higher than those from the approximate models the combination of the two will most likely not lead to satisfactory performance. This requirement constrains this method to use approximate and detailed models which are fairly closely related and thus generate probabilities of comparable magnitude. It should also be noted that in this method there is no guarantee that all of the individual state probabilities that make up the final alignment probability come from detailed models.

The present invention represents a novel approach to the efficient use of high-resolution models in large vocabulary recognition. The proposed method benefits from the use of a continuous density model and a discriminative training criterion which leads to a high recognition performance on a large vocabulary task at the cost of only a marginal increase of computation over a simple discrete pdf system. Another novel feature of the new approach is its ability to make use of limited quantities of new data for rapid adaptation to a particular speaker.

As was mentioned above, the probability that an input utterance corresponds to a given HMM can be computed by the Viterbi algorithm, which finds the sequence of model states which maximizes this probability. This optimization can be viewed as a simultaneous probability computation and alignment of the input utterance and the model.

In accordance with one aspect of the present invention, it has been determined that the alignment paths obtained with relatively computationally inexpensive discrete pdf models can be of comparable quality to those obtained with computationally costly continuous density pdf models, even though the match probabilities or metrics generated by the discrete pdf alignment do not lead to sufficiently high accuracy for large vocabulary recognition.

In accordance with another aspect of the invention, there is provided a decoupling of the alignment and final probability computation tasks. A discrete-pdf system is used to establish alignment paths of an input utterance and a reference model, while the final probability metric is obtained by post-processing frame-state pairs with more powerful, discriminatively trained continuous-density pdfs, but using the same alignment path.

Unlike conventional systems, where model states are characterized by one particular type of observed pdf, the state models in the present system are thus associated with both a discrete (low-resolution) pdf and a discriminatively trained, continuous-density (high-resolution) pdf. The high-resolution pdfs are trained using alignments of models and speech data obtained using the low-resolution pdfs, and thus the discriminative training incorporates knowledge of the characteristics of the discrete pdf system.

BRIEF SUMMARY OF THE INVENTION

In the speech recognition system of the present invention, each input utterance is converted to a sequence of raw or unquantized vectors. For each raw vector the system identifies that one of a preselected plurality of quantized vectors which best matches the raw vector. The raw vector information is, however, retained for subsequent utilization. Each word model is represented by a sequence of states, the states being selected from a preselected group of states. However, for each word model state, there is provided both a discrete probability distribution function (pdf) and a continuous pdf characterized by preselected adjustable parameters. A stored table is provided which contains distance metric values for each combination of a quantized input vector with model state as characterized by the discrete pdfs.

Word models are aligned with an input utterance using the respective discrete PDFs and initial match scores are generated using the stored table. From well matching word models identified from the initial match scores, a ranked scoring of those models is generated using the respective continuous pdfs and the raw vector information. After each utterance, the preselected parameters are adjusted to increase, by a small proportion, the difference in scoring between the top and next ranking models.

Preferably, if a user corrects a prior recognition event by selecting a different word model from the respective selected group, a re-adjustment of the continuous pdf parameters is accomplished by performing, on the current state of the parameters, an adjustment opposite to that performed with the original recognition event and performing on the then current state of the parameters an adjustment equal to that which would have been performed if the newly identified different word model had been the best scoring.

BRIEF DESCRIPTION OF THE DRAWINGS

Corresponding reference characters indicate corresponding elements throughout the several views of the drawings.

DESCRIPTION OF THE PREFERRED EMBODIMENT

As indicated previously, the present invention is particularly concerned with the provision of discriminatively trained multi-resolution vocabulary models which increase accuracy and reduce computational load in an automatic speech recognition (ASR) system. At the outset, however, it is appropriate to describe in general terms the type of speech recognition system to which the present invention is applicable.

Figure 1:
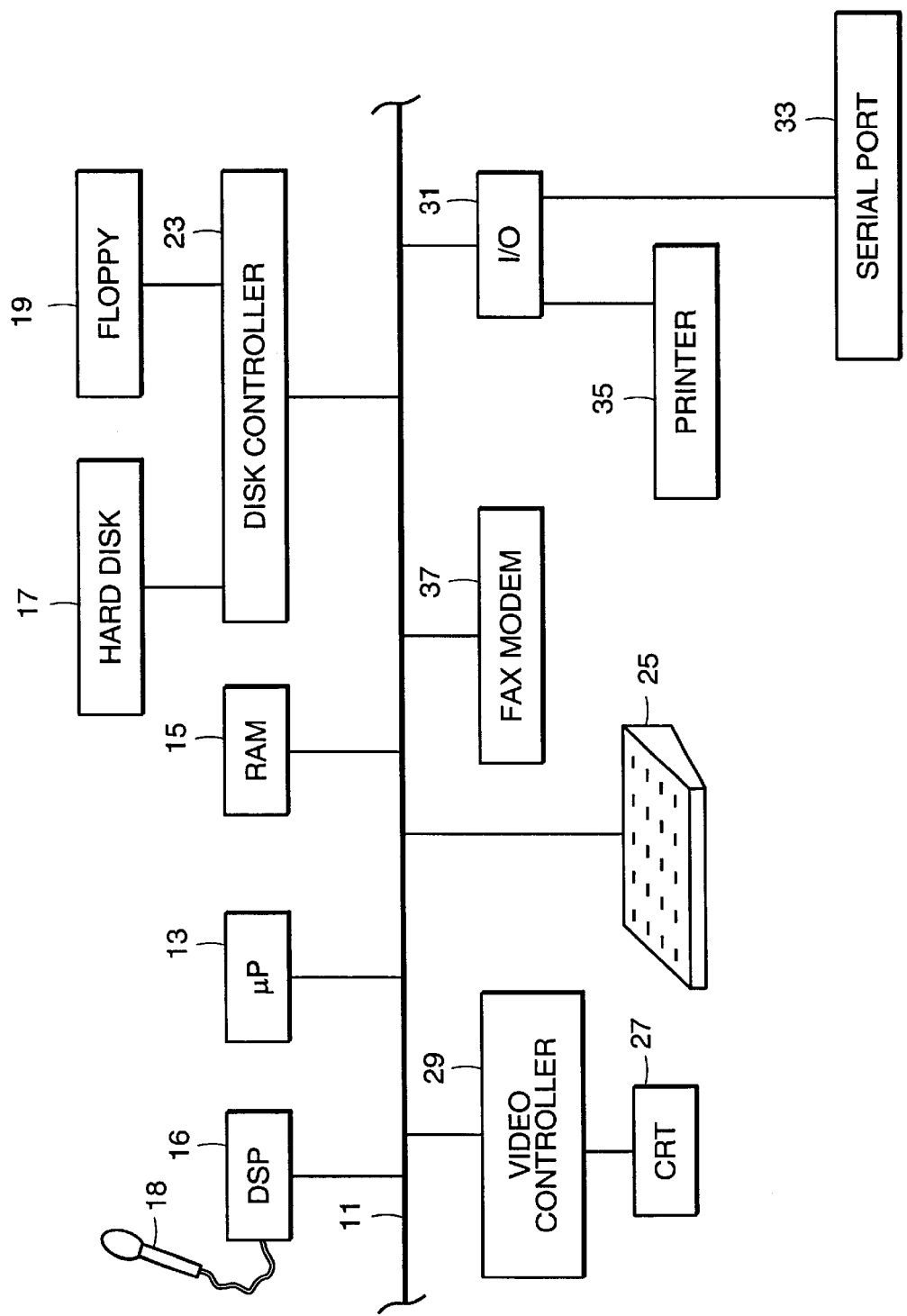
FIG. 1 is a block diagram of a speech recognition system in accordance with the present invention.

Referring now to FIG. 1, the computer system illustrated there is of the type generally referred to as a personal computer. The computer runs under the MS DOS or WINDOWS® operating system and is organized around a system bus, designated generally by reference character 11. The system bus may be of the so called EISA type (Extended Industry Standards Association). The computer system utilizes a microprocessor, designated by reference character 13, which may, for example, be an Intel Pentium type processor. The system is also provided with an appropriate amount of local or random access memory, e.g., 32 megabytes, designated by reference character 15. Additional storage capacity is provided by a hard disk 17 and floppy diskette drive 19 which operate in conjunction with a controller 23 which couples them to the system bus.

User input to the computer system is conventionally provided by means of keyboard 25 and feedback to the user is provided by means of a CRT or other video display 27 operating from the bus through a video controller 29. External communications may be provided through an I/O system designated by reference character 31 which supports a serial port 33 and a printer 35. Advantageously, a fax modem may be provided as indicated by reference character 37. This is particularly useful for forwarding structured medical reports as described in co-assigned U.S. Pat. No. 5,168,548.

To facilitate the use of the computer system for speech recognition, a digital signal processor is provided as indicated by reference character 16, typically this processor being configured as an add-in circuit card coupled to the system bus 11. As is understood by those skilled in the art, the digital signal processor takes in analog signals from a microphone, designated by reference character 18, converts those signals to digital form and processes them e.g., by performing a Fast Fourier Transform (FFT), to obtain a series of spectral frames or vectors which digitally characterize the speech input at successive points in time. As used herein, these input vectors are referred to as the raw input vectors. In the embodiment being described, acoustic vectors ($X_u$) are generated at a rate of one every 10 ms, and have 14 output dimensions.

Preferably, the raw vectors are subjected to a gender-normalizing linear discriminant analysis, as described in my co-pending, coassigned application Ser. No. 08/185,500, the disclosure of which is incorporated herein by reference. The purpose of the analysis is to transform the spectral frames so as to enhance the discriminability of different phonetic events. While the raw vectors are subsequently quantized for use in alignment and initial scoring, the data comprising the raw vectors is preserved for use in more precise final scoring using continuous pdfs as described hereinafter.

Thus $X_u=(x_{u,1}, \ldots, x_{u,t}, \ldots, x_{u,T_u})$ where $T_u$ is the length and $x_{u,t}$ is the $t^{th}$ vector of size 14 in the $u^{th}$ input utterance.

The transformed acoustic frames are vector quantized with a codebook of 1024 standard vector prototypes and each original spectral frame $x_t$ (omitting the subscript u) is assigned a corresponding vector quantizer (VQ) label $v_t$. Each sequence X thus gives rise to a VQ label sequence $V=(v_1, \ldots, v_{i,m}, \ldots, v_T)$.

Reference vocabulary models are composed of sequences of states $Y_i=(y_{i,1}, \ldots, y_{i,m}, \ldots, y_{i,M_i})$, where $M_i$ is the length of a model and i is the model index.

Each model state $y_{i,m}$ is a pointer into a common set of R DTMR states, $S=(s_1, \ldots, s_r, \ldots, s_R)$, each of which is associated in turn with two distinct types of pdf selected from two common pdf pools.

The first type of pdf pool contains discrete distributions which express the probability of observing a quantized frame $v_t$, given a state $s_r$ referenced by $y_{i,m}$ which occurs at the $m^{th}$ position in the $i^{th}$ model, i.e., $Pr(v_t|y_{i,m})=Pr(v_t|s_r)$. The computation of the match probability is simplified if the pdfs are converted to negative logarithms and thus we define the quantity $VQLP(v_t, y_{i,m})=-\log(Pr(v_t|y_{i,m}))$. Note that VQLP is essentially a table of precomputed log-probabilities and thus the evaluation of the discrete-pdf models consists of a very fast table lookup.

The second pool of pdfs, on the other hand, is made up of continuous distributions which give the probability of observing a specific spectrum $x_t$ given a particular state $s_r$ referenced by $y_{i,m}$, i.e., $Pr(x_t|y_{i,m})=Pr(x_t|s_r)$. As is the case for the discrete pdfs it is more convenient to use the continuous-density probabilities in the log-domain, and thus we define $CDLP(x_t|y_{i,m})=-\log(Pr(x_t|y_{i,m}))$.

The continuous pdfs are parametric models and thus the probabilities cannot be precomputed. Rather than storing pre-computed probabilities as is the case for the discrete pdfs, we store the pdf parameters themselves and use them to compute the log-probabilities for specific input frames.

Figure 2:
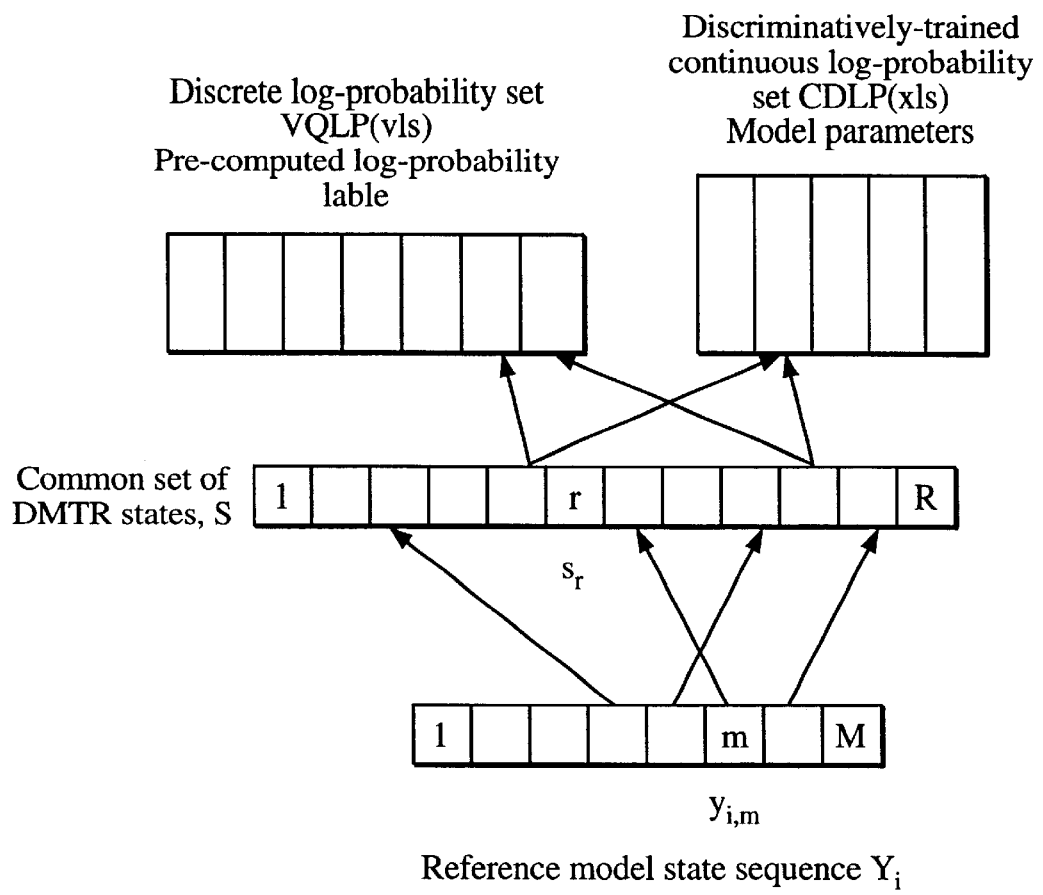
FIG. 2 illustrates vocabulary word models used in the speech recognition system of the present invention.

Note that individual pdfs in each set may be shared by acoustically similar states in different models. FIG. 2 illustrates the relationship between model states and the two sets of log-pdfs.

The vector-quantized input utterances V are matched against reference models $Y_i$ by the Viterbi algorithm described in greater detail hereinafter using the discrete-pdf section of the DTMR models. The algorithm evaluates $-\log(Pr(V|Y_i))$, the negative logarithm of the probability of observing the input sequence given the model by finding the best alignment path between the input utterance and the model states.

Define Sum(t,m) as the accumulated negative log-probabilities. The alignment algorithm used in this work can then be summarized as follows.

```
Initialization:
    Sum(0,0) = 0
Evaluation:
    for t := 1 to T do
        for m := 1 to M_i do
            Sum(t,m) =    VQLP(v_t,y_{i,m}) + min(Sum(t – 1,m),Sum(t – 1,m – 1),Sum(t,m – 1))
            Pred_t(t,m) = arg min(Sum(t – 1,m),Sum(t – 1,m – 1),Sum(t,m – 1))
                           t
            Pred_m(t,m) = arg min(Sum(t – 1,m),Sum(t – 1,m – 1),Sum(t,m – 1))
                           m
        end;
    end;
Termination:
    return Sum_i = Sum(T,M)/(T + M)
``` where $Pred_t(t,m)$ and $Pred_m(t,m)$ are the indices of the best predecessor score at position t,m.

Figure 3:
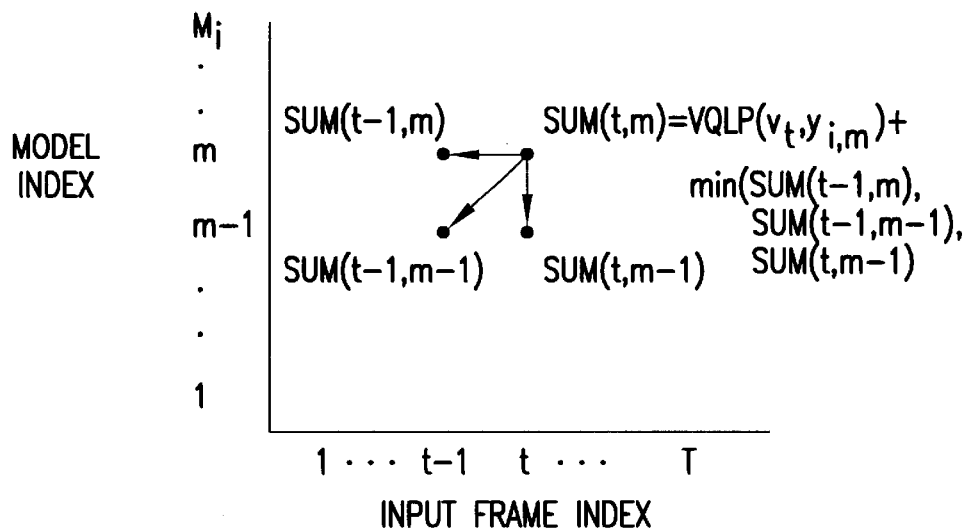
FIG. 3 illustrates a recursion procedure used in the speech recognition system of the present invention.

This basic recursion is also illustrated in FIG. 3 of the drawings.

The following structures are set up to store the alignment path between an input utterance and a given reference model:

$$f_i=(f_{i,1}, \ldots, f_{i,p}, \ldots, f_{i,P_i}) \quad (1)$$

$$q_i=(q_{i,1}, \ldots, q_{i,p}, \ldots, q_{i,P_i}) \quad (2)$$

where $f_{i,p}$ is the input frame index and $q_{i,p}$ is the state index at position p on the path for the $i^{th}$ reference model, and $P_i$ is the path length. The best alignment path is recovered by using the predecessor arrays $Pred_t(t,m)$ and $Pred_m(t,m)$ in the following backtracking recursion:

```
Initialization:
    p=0,t=T,m = M_i
Backtracking:
    while t ≥ 1 and m ≥ 1 do
        f_{i,p} = t
        q_{i,p} = y_{i,m}
        t_new = Pred_t(t,m)
        m_new = Pred_m(t,m)
        t = t_new
        m = m_new
        p++
    end;
Termination:
    P_i = p
```

The original acoustic vector at a particular path point p can thus be identified as $x(f_{i,p})$ while the state index at path position p is directly given by $q_{i,p}$.

The normalized scores $\widehat{Sum}_i$ for all the reference models aligned with a particular input utterance can be sorted and only a small number of models with the lowest normalized score need be rescored in the next recognition stage.

In the rescoring stage the alignment paths for a small number of the models with the best discrete-pdf scores are traversed, and new scores are computed for the frame-state pairs defined by these paths using the set of discriminatively trained continuous density pdfs.

The continuous density pdfs used in this work are a simplified form of Gaussian Mixtures. Experimental evidence revealed that with the use of discriminative training there was no advantage to using the full mixture models over the simplified version. In addition, reducing the number of free parameters in the model significantly improves their trainability with limited quantities of data.

The standard Gaussian Mixture log-probability density function GMLP is defined as follows:

$$GMLP(x(t), s_r) = -\log\left(\sum_{k}^{N(s_r)} a(s_r, k) \mathcal{N}(x(t); \mu(s_r, k); \sum(s_r, k))\right) \quad (3)$$

where $a(s_r,k)$ is the weight of mixture component k in state $s_r$ and $N(x;\mu;\Sigma)$ denotes the probability of observing x(t) given a multivariate Gaussian with mean $\mu$ and covariance $\Sigma$. $N(s_r)$ is the number of mixture components.

The discriminatively trained continuous density log-pdf (CDLP) used in this work is as follows:

$$CDLP(x(f_{i,p}), q_{i,p}) = \min_{1 \leq k \leq N(q_{i,p})} [d(x(f_{i,p}), \mu(q_{i,p}, k))] \quad (4)$$

where $$d(x(f_{i,p}), \mu(q_{i,p}, k)) = \sum_{l=1}^{14} (x(f_{i,p}, l) - \mu(q_{i,p}, k, l))^2 \quad (5)$$

The continuous pdf model for state $q_{i,p}$ thus consists of $N(q_{i,p})$ 14-dimensional mean vectors $\mu$. Due to the lack of normalizing terms in equation (4), CDLP is not a true log-probability, and thus is not interchangeable with the discrete log-probabilities VQLP. This incompatibility is not an issue, however, because once the alignment paths are established the discrete log-probabilities are no longer used. The ability to utilize incompatible pdfs constitutes an advantage over known schemes.

The new score for a path corresponding to an alignment of input utterance with reference model i is obtained as $$D_i = \frac{1}{P_i} \sum_{p=1}^{P_i} CDLP(x(f_{i,p}), q_{i,p}) \quad (6)$$

The rescored models are then re-sorted according to their new scores.

The role of the discrete-density component of the DTMR models is two-fold: for each input utterance it is used to screen out the great majority of incorrect models and produce a small set of likely candidates, and it is also used to obtain accurate alignment of the input utterance to reference models. It is, however, not called upon to provide fine discrimination between highly confusable models. Rather, that is the role of the continuous density rescoring pdfs.

For these reasons it is sufficient to rely on conventional Maximum-Likelihood training for the discrete-density component, and apply a discriminative criterion to the training of the continuous density component only. The continuous pdf training however, users alignment paths established on the basis of the discrete pdfs.

The first step in the training of the continuous density pdfs is the initialization of the mean vectors $\mu s_r,k$. This can be done by training a conventional Maximum Likelihood Gaussian Mixture pdf for each model state from the input utterance frames aligned with that state using the discrete-pdf component. The total number of mean vectors can be set to reflect the variance of the data frames aligned with each state during the iterative training. Upon convergence of the initial training, the mean vectors with significant probabilities are retained, while all other parameters associated with a standard Gaussian Mixture model are discarded.

The next step consists of the discriminative training of the mean vectors. This is accomplished by defining an appropriate training objective function which reflects recognition error-rate and optimizing the mean parameters so as to minimize this function.

One common technique applicable to the minimization of the objective function is gradient descent optimization. In this approach, the objective function is differentiated with respect to the model parameters, and the parameters are then modified by the addition of the scaled gradient. A new gradient which reflects the modified parameters is computed and the parameters are adjusted further. The iteration is continued until convergence is attained, usually determined by monitoring the performance on evaluation data independent from the training data.

A training database is preprocessed by obtaining for each training utterance a short list of candidate recognition models. Each candidate list contains some number of correct models (subset C) and a number of incorrect (subset I) models. Each list is sorted by the score Di, and an augmented alignment path structure is retained for each reference model in the list. The additional stored path information is as follows:

$$b_i = (b_{i,1}, \ldots, b_{i,p}, \ldots, b_{i,P_i}) \quad (7)$$

$b_i$ is used to store the index of the best mean vector at a particular path point. For example, if p connects the frame $x(f_{i,p})$ and state $q_{i,p}$, $$b_{i,p} = \arg\min_{1 \le k \le N(q_{i,p})} [d(x(f_{i,p}), \mu(q_{i,p}, k))] \quad (8)$$

Figure 4:
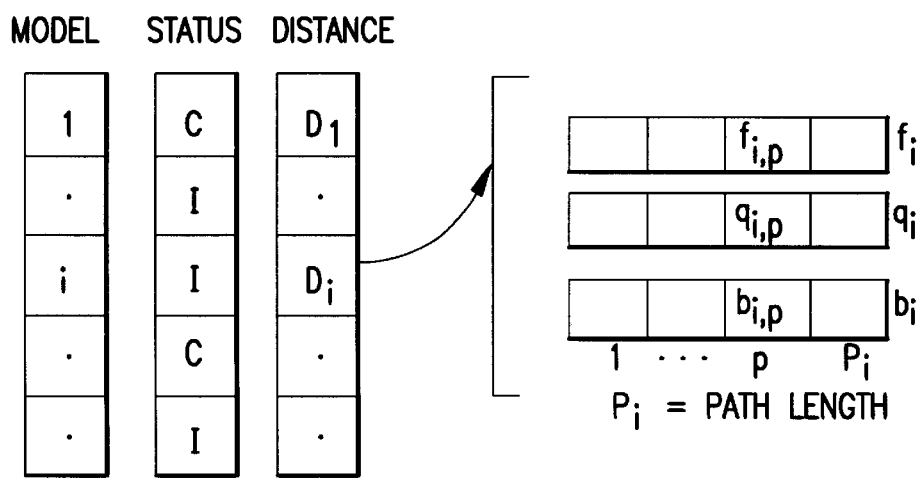
FIG. 4 illustrates a training data structure set used in training word models.

FIG. 4 illustrates the training structure set for an input utterance.

An error function $\epsilon_u$ for a particular training utterance u is computed from the pairwise error functions $O_{i,j}$:

$$\varepsilon_u = \frac{1}{2} \sum_{i \in C} \sum_{j \in I} o_{i,j}^2 \quad (9)$$

where $$o_{i,j} = \left(1 + e^{-\beta(D_i - D_j)}\right)^{-1} \quad (10)$$

$\beta$ is a scaler multiplier, $D_i$, i∈C is the alignment score of the input token and a correct model i, and $D_j$, j∈I is the score of the token and an incorrect model j. The sizes of the sets C and I can be controlled to determine how many correct models and incorrect or potential intruder models are used in the training.

$O_{i,j}$ takes on values near 1 when the correct model score $D_i$ is much greater (i.e., worse) than the intruder score Dj, and near 0 when the converse is true. Values greater than 0.5 represent recognition errors while values less than 0.5 represent correct recognitions. The parameter $\beta$ controls the amount of influence "near-errors" will have on the training.

The score $D_i$ between the training utterance and the target model i is obtained by rescoring the alignment path as shown in equation (6). In practice the normalization by path length $P_i$ can be ignored during training. Thus:

$$D_i = \sum_{p=1}^{P_i} CDLP(x(f_{i,p}), q_{i,p}) \quad (11)$$

which can be rewritten as $$D_i = \sum_{p=1}^{P_i} d(x(f_{i,p}), \mu(q_{i,p}, b_{i,p})) \quad (12)$$

A similar expression can be written for $D_j$.

Figure 5:
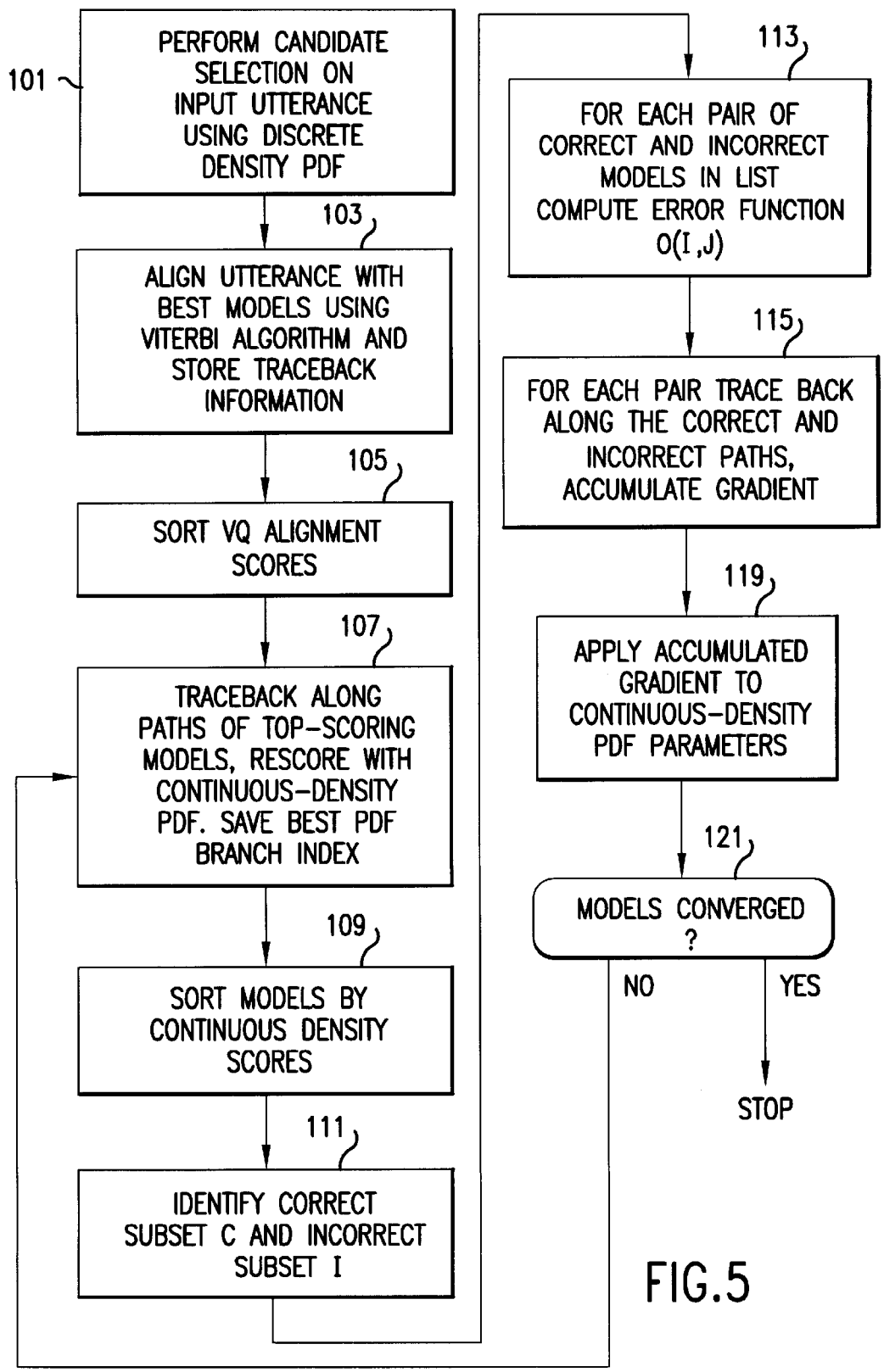
FIG. 5 is a flow chart illustrating initial, batch training of word models.

Differentiating the error function with respect to a particular component of the mean vector $\mu(s,k,l)$ yields:

$$-\frac{\partial \varepsilon_u}{\partial \mu(s, k, l)} = 2\beta \sum_{i \in C} \sum_{j \in I} o_{i,j}^2 (1 - o_{i,j}) \left\{ \sum_p^{P_i} (x(f_{i,p}, l) - \mu(q_{i,p}, b_{i,p}, l)) \delta(s, q_{i,p}) \delta(k, b_{i,p}) - \sum_p^{P_i} (x(f_{j,p}, l) - \mu(q_{j,p}, b_{j,p}, l)) \delta(s, q_{j,p}) \delta(k, b_{j,p}) \right\} \quad (13)$$

where δ (a,b) is the Kronecker delta and equals 1 if a=b and 0 otherwise. The gradient is averaged over all utterances and correct-incorrect pairs:

$$\Delta \mu(s, k, l) = \frac{1}{U} \sum_u \frac{1}{N_{C,I,u}} \frac{-\partial \varepsilon_u}{\partial \mu(s, k, l)} \quad (14)$$

where $N_{C,I,u}$ is the number of correct-incorrect model pairs for utterance u. The mean components are modified by the addition of the scaled gradient:

$$\hat{\mu}(s, k, l) = \mu(s, k, l) + w \Delta \mu(s, k, l) \quad (15)$$

where w is a weight which determines the magnitude of the change to the parameter set in one iteration. This procedure is illustrated in the flowchart of FIG. 5.

Initially, candidate models are selected using the discrete density pdfs as indicated in step 101. Again using the discrete pdfs, the input utterances aligned with the best models using the Viterbi algorithm and the traceback information is stored as indicated at block 103. The scores are sorted as indicated at block 105 and then the top scoring models are re-scored as indicated at block 107 using the continuous density pdfs, the rescoring being done along the alignment path determined with the discrete pdfs.

As indicated at block 109, the models are then re-sorted based on the scores obtained with the continuous density pdfs. Correct and incorrect models are identified as indicated at block 111 and for each pair of correct and incorrect models an error function is computed as indicated at block 113. Since multiple models may be used for each vocabulary word, the procedure provides for subsets rather than just individual correct and incorrect examples.

As indicated at block 115, a gradient is accumulated for each pair trace backed along the correct and incorrect paths. An accumulated gradient is applied to the continuous density pdf parameters as indicated at block 119. A test for convergence is applied as indicated at block 121 and the procedure beginning at block 117 is repeated until the models have converged.

In each iteration of the batch mode training of the DTMR models outlined in the previous section, all training utterances are processed before the model parameters are updated. It is however also possible to train the models with an on-line adaptive algorithm, where the models are updated after each training utterance has been processed. The on-line training makes it possible to rapidly adapt the DTMR models with limited amounts of speech from a new user of the recognition system, and ideally this may be done in a fashion invisible to the user, with speech produced in the course of doing useful work with the recognition system.

Like batch training, on-line training requires the computation of the error function gradient for all current model parameters specified by the correct and incorrect alignment paths in the candidate set for a particular input utterance u. Unlike in the batch training case, the gradient is not accumulated but is applied immediately to the model parameters:

$$\hat{\mu}(s, k, l)_u = \mu(s, k, l)_{u-1} + w' \Delta_u \mu(s, k, l)_{u-1} \quad (16)$$

The notation $\Delta u$ means that the utterance u is used to compute the gradient, and the operation is performed on the current model $\mu(s,k,l)_{u-1}$ (which was presumably also adapted on the previous utterance u-1).

The weighting used in the on-line adaptation (ω') is set much smaller than the weighting used in the batch-mode training since the reliability of the change estimated from a single utterance is considerably lower than the estimate from a complete training set. In other words, ω'<<ω.

A complicating factor in on-line adaptation is that the identity of the input utterances is not known with certainty. Relying on the recognition system to identify the input utterances will inevitably lead to errors and misadaptations of the models. Delaying the adaptation to give the user a chance to make corrections is not desirable, because given the different correction strategies favored by different users, it is difficult to predict how long the delay needs to be.

The solution to this problem provided by the present invention is to begin by assuming that the top-choice recognition candidate is in fact the correct answer and to update the models immediately. However, if the user makes a correction at some subsequent time, the original misadaptation will be undone and a new modification of the model parameters will be performed based on the corrected information.

In order to undo the incorrect adaptation at a later time, the original input utterance corresponding to each candidate set must be retained, although the candidate alignment paths need not be saved. When the user specifies the correct answer, the candidate alignment paths are regenerated and the utterance gradient term is recomputed. The weighted gradient is subtracted from the affected model parameters. A new gradient term, reflecting the correct target model is calculated and applied to the DTMR parameters. This sequence of operations does not completely undo the original error because to so do would mean undoing all the other updates that may have intervened between the original recognition and the correction action. In practice, however, the delayed correction has proved to be as effective as supervised adaptation, i.e. where the correct answer is identified before gradient computation.

The delayed correction algorithm is as follows:

```
for u := 1 to U do
    Obtain candidate list for u using μ_{u-1}
    Identify subsets I_{top-choices} (assumed incorrect models)
        and C_{top-choice} (assumed correct models).
    Compute Δ_u μ(s,k,l)_{u-1} for all s,k,l specified by alignment
        paths for all pairs in I_{top-choice} and C_{top-choice}.
    Update μ(s,k,l)_u = μ(s,k,l)_{u-1} + ω'Δ_u μ(s,k,l)_{u-1}
    Save candidate list (including alignment paths) for u
    if user corrects result for utterance v,[1 <= v <= u] then
        Retrieve utterance v
        Retrieve candidate list and alignment paths for v
        Identify subsets I_{top-choice} and C_{top-choice}
        Compute Δ_v μ(s,k,l)_u for all s,k,l specified by alignment
            paths for all pairs in I_{top-choice} and C_{top-choice}.
        Update μ(s,k,l)_u = μ(s,k,l)_u − ω'Δ_v μ(s,k,l)_u
        Identify subsets I_{corrected} and C_{corrected}
        Compute Δ_v μ(s,k,l)_u for all s,k,l specified by alignment
            paths for all pairs in I_{corrected} and C_{corrected}.
        Update μ(s,k,l)_u = μ(s,k,l)_u + ω'Δ_v μ(s,k,l)_u
    end
end
```

Figure 6:
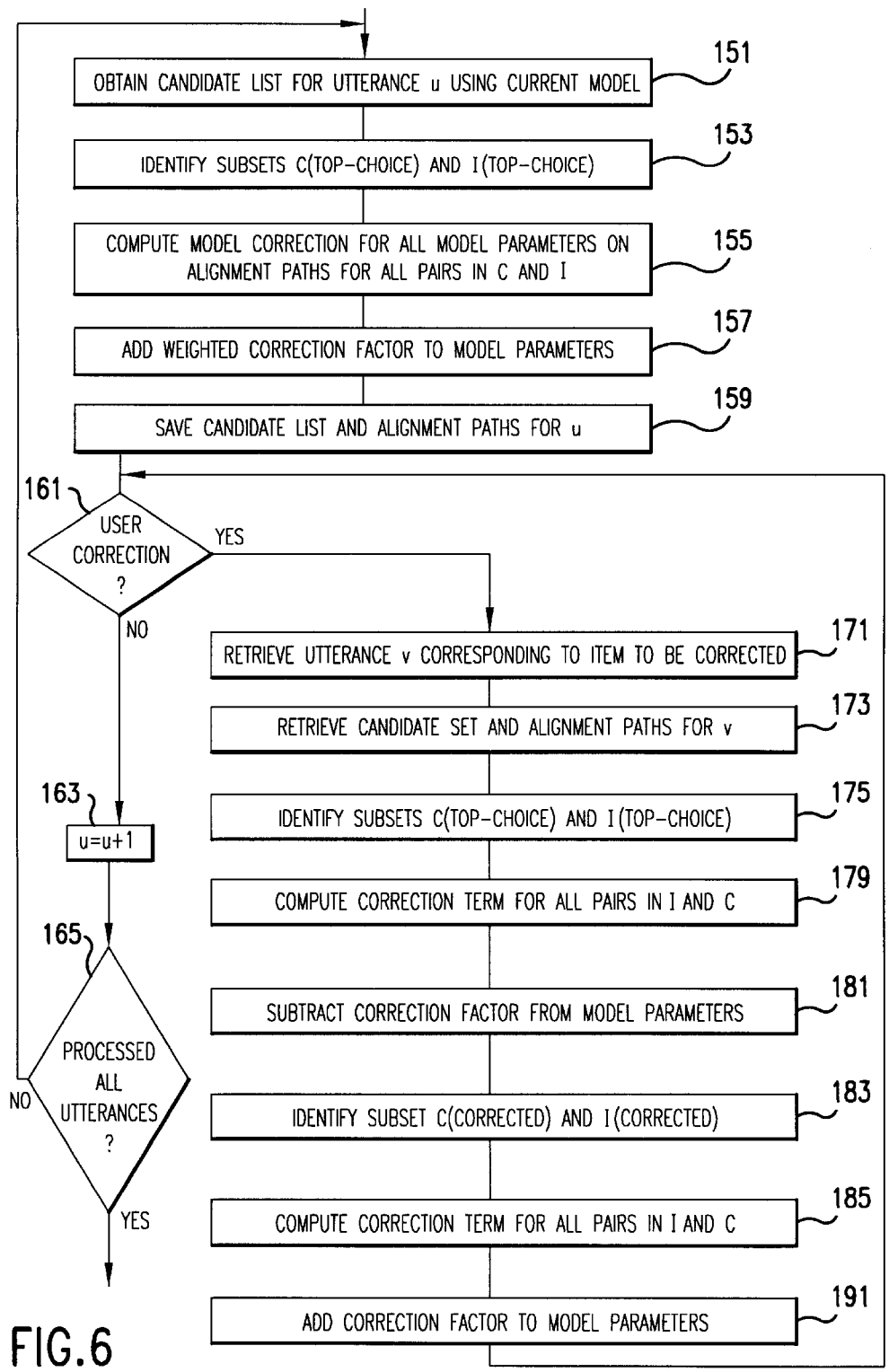
FIG. 6 is a flow chart illustrating on-line adaptive training of word models.

As indicated previously, adaptation is performed as recognition is performed on each utterance based on the assumption that the recognition is correct and a re-adjustment is performed only when the user makes a correction, even though that correction may be made after the user has issued several intervening utterances. This procedure is illustrated in the flowchart of FIG. 6. After a candidate list is obtained as indicated at block 151, correct (C) and incorrect (I) subsets are identified as indicated at block 153. Corrections to model parameters are computed for all pairs C and I as indicated at block 155 and the corrections are added to the then current model parameters, as indicated at block 157, using a relatively low weight. The candidate list and alignment paths are stored as indicated at block 159. If the user does not make a correction, the utterance path is incremented, as indicated at block 163, and, if there are no pending utterances, as tested at block 165, the procedure returns to the initial point to await a new utterance.

If, at the block 161, the user corrects an earlier utterance, the stored data corresponding to the item to be corrected is retrieved as indicated at block 171. Likewise, the candidate set and alignment paths for the utterance to be corrected are retrieved as indicated at block 173. The correct and incorrect subsets are identified as indicated at block 175 and the correction term is computed for all pairs in I and C as indicated at block 179. This information can either be computed at the time of correction or stored from the initial recognition. The corresponding correction factor is subtracted from the then extant model parameters without attempting to undue all intervening corrections which may have been applied. The subset for the C (after correction) and I (after correction) are identified as indicated at block 183 and correction terms are computed for all pairs in I and C as indicated at block 183. This correction factor is then added to the model parameters as indicated at block 191. As indicated, a relatively low weighting factor is used in this adjustment since it is based on a single example rather than a batch of examples as was the case of the adjustments made during the initial or batch training illustrated in FIG. 5.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A method for a speech recognition system with word models having descriptive parameters and associated continuous probability density functions (PDFs) to dynamically adjust the word model descriptive parameters, the method comprising:

a. converting an input utterance into a sequence of representative vectors;

b. comparing the sequence of representative vectors with a plurality of word model state sequences and using the continuous PDFs to score each word model state sequence for a likelihood that such state sequence represents the sequence of representative vectors;

c. selecting the word model state sequence having the best score as a recognition result for output to a user;

d. automatically performing a discriminative adjustment to the descriptive parameters of the best scoring word model state sequence and the descriptive parameters of at least one inferior scoring word model state sequence; and e. if the user corrects the recognition result by selecting a different word sequence,
     i. automatically performing an adjustment to the descriptive parameters modified in step (d) that substantially undoes the discriminative adjustment performed in step (d), and
     ii. automatically performing a discriminative adjustment to the descriptive parameters of the word model state sequences for the words in the user corrected word sequence and the descriptive parameters of at least one other word model state sequence.

2. A method as in claim 1, wherein in step (d) the at least one inferior scoring word model state sequence is the word model state sequence having the second best score.

3. A method as in claim 1, wherein in step (e)(ii) the at least one other word model state sequence is the word model state sequence having the next best score to the word model state sequence of the user corrected word sequence.

4. A method as in claim 1, wherein the discriminative adjustment uses a gradient descent technique.

5. A method for a speech recognition system to convert an input utterance into a representative word sequence text, the method comprising:

a. converting the input utterance into a sequence of representative vectors;

b. quantizing the sequence of representative vectors into a sequence of standard prototype vectors;

c. using discrete probability distribution functions (PDFs) of vocabulary word models to generate an alignment of the sequence of standard prototype vectors with a plurality of word model state sequences and to calculate initial match scores representative of a likelihood that a given word model state sequence alignment represents the sequence of standard prototype vectors;

d. while retaining the alignment established in step (c), rescoring word model state sequences having an initial match score within a selected threshold value of the word model state sequence having the best score by comparing the word model state sequences to be rescored with the sequence of representative vectors using continuous PDFs of the word models; and e. selecting the word model state sequence having the best rescore as a recognition result for output to a user.

6. A method as in claim 5, further comprising:

f. automatically performing a discriminative adjustment to descriptive parameters of the best rescored word model state sequence and the descriptive parameters of an inferior scoring word model state sequence; and g. if the user corrects the recognition result by selecting a different word sequence,
     i. automatically performing an adjustment to the descriptive parameters modified in step (f) that substantially undoes the discriminative adjustment performed in step (f), and
     ii. automatically performing a discriminative adjustment to the descriptive parameters of the word model state sequences for the words in the user corrected word sequence and the descriptive parameters of at least one other word model state sequence.

7. A method as in claim 6, wherein in step (f) the at least one inferior scoring word model state sequence is the word model state sequence having the second best score.

8. A method as in claim 6, wherein in step (g)(ii) the at least one other word model state sequence is the word model state sequence having the next best score to the word model state sequence of the user corrected word sequence.

9. A method as in claim 5, wherein the discriminative adjustment uses a gradient descent technique.

* * * * *